Patented June 19, 1928.

1,674,053

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

MANUFACTURE OF SPONGE RUBBER.

No Drawing. Application filed September 22, 1927. Serial No. 221,386.

My invention relates to the manufacture of sponge rubber, and the particular object of my invention is to provide a new and improved method for the manufacture of sponge rubber, and a new and improved sponge rubber. My invention is applicable to the manufacture of sponge rubber products either in molds or in sheet form or in open heaters with or without pressure.

I may carry out my invention by compounding and milling a sponge rubber stock containing in itself the necessary blowing agent, and itself vulcanizable into sponge rubber of the type now in use, by warming this stock on an open mill until the stock is soft and more or less plastic, by adding to this stock a quantity of vulcanized sponge rubber particles with which is preferably incorporated an additional blowing agent, by forming and shaping the mass as desired, and by then vulcanizing by any suitable vulcanization process, such as any of the methods hereinabove set forth.

The vulcanized sponge rubber particles may be produced by grinding sponge rubber scrap, and the size of the pores or cells in the finished product can be regulated largely by the quantity and degrees of fineness of the vulcanized sponge rubber particles, and by the amount of the blowing agent added with the vulcanized sponge rubber particles.

In actual practice I have employed my process successfully by compounding a stock containing rubber ten pounds, paraffin or other softener ten ounces, sulphur eight ounces, zinc oxide one pound, ammonia five ounces, and fillers and pigments as desired, and by adding to this from one to five pounds of vulcanized sponge rubber particles.

My present experience indicates that extreme care should be exercised in adding the vulcanized sponge rubber particles, that excessive grinding of these particles should be avoided, and that excessive milling of the compound after the addition of these particles also should be avoided. My present experience also indicates that it is desirable to add a second blowing agent with the vulcanized sponge rubber particles, but also that the amount of this second blowing agent will vary widely, apparently as a result of variation in several factors, particularly as a result of variation in the fineness of the vulcanized sponge rubber particles, of variation in the quantity of the sponge rubber particles, of variation in the then prevailing humidity, and of variation in the result desired to be obtained, particularly in the size of the pores desired in the finished product.

The method of manufacture herein set forth not only results in economy because of the use of the vulcanized sponge rubber scrap but at the same time produces a product which is actually superior, probably due to the presence of the vulcanized sponge rubber particles as cell nuclei.

From the above description it will be obvious to those skilled in the art that I have provided a new and improved process for manufacturing sponge rubber, and a new and improved sponge rubber. At the same time those skilled in the art also will understand that the particular embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

1. The method of manufacturing sponge rubber which comprises: incorporating into unvulcanized sponge rubber stock a quantity of vulcanized sponge rubber particles; forming as desired; and then vulcanizing.

2. The method of manufacturing sponge rubber which comprises: incorporating into an unvulcanized sponge rubber stock itself vulcanizable into sponge rubber, a quantity of vulcanized sponge rubber particles; forming as desired; and then vulcanizing.

3. The method of manufacturing sponge rubber which comprises: incorporating into unvulcanized sponge rubber stock a quantity of vulcanized sponge rubber particles and additional blowing agent; forming as desired; and then vulcanizing.

4. The method of manufacturing sponge rubber which comprises: incorporating into unvulcanized sponge rubber stock a quantity of vulcanized sponge rubber particles with which has been mixed additional blowing agent; forming as desired; and then vulcanizing.

5. The method of manufacturing sponge rubber which comprises: incorporating into an unvulcanized sponge rubber stock itself vulcanizable into sponge rubber, a quantity of vulcanized sponge rubber particles and additional blowing agent; forming as desired; and then vulcanizing.

6. The method of manufacturing sponge rubber which comprises: incorporating, into an unvulcanized sponge rubber stock itself vulcanizable into sponge rubber, a quantity of vulcanized sponge rubber particles with which has been mixed additional blowing agent; forming as desired; and then vulcanizing.

7. The method of manufacturing sponge rubber which comprises: incorporating into unvulcanized sponge rubber stock, after said stock has been thoroughly worked and warmed, and with but little additional working, a quantity of vulcanized sponge rubber particles; forming as desired; and then vulcanizing.

8. The method of manufacturing sponge rubber which comprises: incorporating, into an unvulcanized sponge rubber stock itself vulcanizable into sponge rubber, after said stock has been thoroughly worked and warmed, and with but little additional working, a quantity of vulcanized sponge rubber particles; forming as desired; and then vulcanizing.

9. The method of manufacturing sponge rubber which comprises: incorporating into unvulcanized sponge rubber stock, after said stock has been thoroughly worked and warmed, and with but little additional working, a quantity of vulcanized sponge rubber particles and additional blowing agent; forming as desired; and then vulcanizing.

10. The method of manufacturing sponge rubber which comprises: incorporating into unvulcanized sponge rubber stock, after said stock has been thoroughly worked and warmed, and with but little additional working, a quantity of vulcanized sponge rubber particles with which has been mixed additional blowing agent; forming as desired; and then vulcanizing.

11. The method of manufacturing sponge rubber which comprises: incorporating, into an unvulcanized sponge rubber stock itself vulcanizable into sponge rubber, after said stock has been thoroughly worked and warmed, and with but little additional working, a quantity of vulcanized sponge rubber particles and additional blowing agent; forming as desired; and then vulcanizing.

12. The method of manufacturing sponge rubber which comprises: incorporating, into an unvulcanized sponge rubber stock itself vulcanizable into sponge rubber, after said stock has been thoroughly worked and warmed, and with but little additional working, a quantity of vulcanized sponge rubber particles with which has been mixed additional blowing agent; forming as desired; and then vulcanizing.

13. A sponge rubber product containing distributed therethrough particles of previously vulcanized sponge rubber.

14. The improvement in manufacture of sponge rubber substantially as described and for the purpose set forth.

In testimony whereof I hereunto affix my signature.

THOMAS W. MILLER.